United States Patent
Agiwal

(10) Patent No.: US 12,418,927 B2
(45) Date of Patent: Sep. 16, 2025

(54) SYSTEM AND METHOD OF PDCCH SKIPPING AND SCHEDULING REQUEST

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 18/123,634

(22) Filed: Mar. 20, 2023

(65) Prior Publication Data

US 2023/0300854 A1    Sep. 21, 2023

(30) Foreign Application Priority Data

Mar. 21, 2022 (KR) .......... 10-2022-0034912

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
CPC ... H04W 72/232; H04W 72/12; H04W 72/21; H04W 24/08; H04W 28/0278; H04L 5/001
See application file for complete search history.

(56) References Cited

U.S. PATENT DOCUMENTS

| | | | |
|---|---|---|---|
| 2020/0092814 A1* | 3/2020 | Zhou | H04W 52/0235 |
| 2022/0217636 A1 | 7/2022 | Shrivastava et al. | |
| 2023/0025742 A1 | 1/2023 | Agiwal | |
| 2023/0217525 A1* | 7/2023 | Kim | H04W 76/27 370/329 |
| 2024/0406974 A1* | 12/2024 | Lee | H04W 72/12 |
| 2025/0008599 A1* | 1/2025 | Babaei | H04L 1/1835 |

FOREIGN PATENT DOCUMENTS

| | | |
|---|---|---|
| EP | 4142379 A1 | 3/2023 |
| EP | 4156760 A1 | 3/2023 |
| KR | 10-2023-0014659 A | 1/2023 |
| WO | 2020226397 A1 | 11/2020 |

(Continued)

OTHER PUBLICATIONS

Machine translated English WO2023112960A1 retrieved from PE2E on May 13, 2025. (Year: 2023).*

(Continued)

*Primary Examiner* — Charles C Jiang
*Assistant Examiner* — Rachel Elizabeth Marks

(57) ABSTRACT

The disclosure relates to a 5G or 6G communication system for supporting a higher data transmission rate. The present disclosure provides method and apparatus for physical downlink control channel (PDCCH) monitoring. The method comprises receiving, from a base station, downlink control information (DCI) including an indication indicating skipping of PDCCH monitoring for a duration; in case that a scheduling request (SR) is triggered and not canceled, identifying whether the SR is triggered for a buffer status report (BSR); determining at least one serving cell, based on the identified result; and cancelling the skipping of PDCCH monitoring on the at least one serving cell.

12 Claims, 6 Drawing Sheets

(56) References Cited

FOREIGN PATENT DOCUMENTS

| WO | 2021217351 | A1 | | 11/2021 |
|----|------------|----|---|---------|
| WO | 2021253431 | A1 | | 12/2021 |
| WO | WO-2023112960 | A1 | * | 6/2023 |

OTHER PUBLICATIONS

International Search Report and Written Opinion of the International Searching Authority dated Jun. 7, 2023, in connection with International Application No. PCT/KR2023/003653, 8 pages.
Samsung, "Summary of [AT116bis-e][057][ePowSav] PDCCH Skip (Samsung)," R2-2201915, 3GPP TSG RAN WG2 Meeting #116bis-e, Jan. 2022, 17 pages.
Moderator (VIVO), "FL summary#2 of DCI-based power saving adaptation," R1-2202574, 3GPP TSG RAN WG1#108-e, Mar. 2022, 158 pages.
Huawei et al., "Discussion on RLM/BFD relaxation and DCI-based power saving adaptation," R2-2201156, 3GPP TSG-RAN WG2 Meeting #116bis electronic, Jan. 2022, 7 pages.
Qualcomm Incorporated, "Enhancements for adaptive PDCCH monitoring," R2-2200187, 3GPP TSG RAN WG2 Meeting #116bis-e, Jan. 2022, 3 pages.
Supplementary European Search Report dated May 12, 2025, in connection with European Application No. 23775242.3, 12 pages.
Samsung, "PDCCH Skipping in RRC_Connected," R2-2200200, 3GPP TSG-RAN2 Meeting #116bis, Electronic, Jan. 17-25, 2022, 2 pages.

* cited by examiner

SYSTEM AND METHOD OF PDCCH SKIPPING AND SCHEDULING REQUEST

CROSS-REFERENCE TO RELATED APPLICATION

This application is based on and claims priority under 35 U.S.C. § 119 of a Korean Patent Application Number 10-2022-0034912, filed on Mar. 21, 2022, in the Korean Intellectual Property Office, the disclosure of each of which is incorporated by reference herein in its entirety.

BACKGROUND

1. Field

The disclosure relates to a wireless communication system. Specifically, the disclosure relates to an apparatus, a method and a system for physical downlink control channel (PDCCH) monitoring.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: receiving, from a base station, downlink control information (DCI) including an indication indicating skipping of physical downlink control channel (PDCCH) monitoring for a duration; in case that a scheduling request (SR) is triggered and not canceled, identifying whether the SR is triggered for a buffer status report (BSR); determining at least one serving cell, based on the identified result; and canceling the skipping of PDCCH monitoring on the at least one serving cell.

In accordance with an aspect of the disclosure, a terminal is provided. The terminal comprises: a transceiver; and a controller configured to: control the transceiver to receive, from a base station, downlink control information (DCI) including an indication indicating skipping of physical downlink control channel (PDCCH) monitoring for a duration, in case that a scheduling request (SR) is triggered and not canceled, identify whether the SR is triggered for a buffer status report (BSR), determine at least one serving cell, based on the identified result, and cancel the skipping of PDCCH monitoring on the at least one serving cell.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
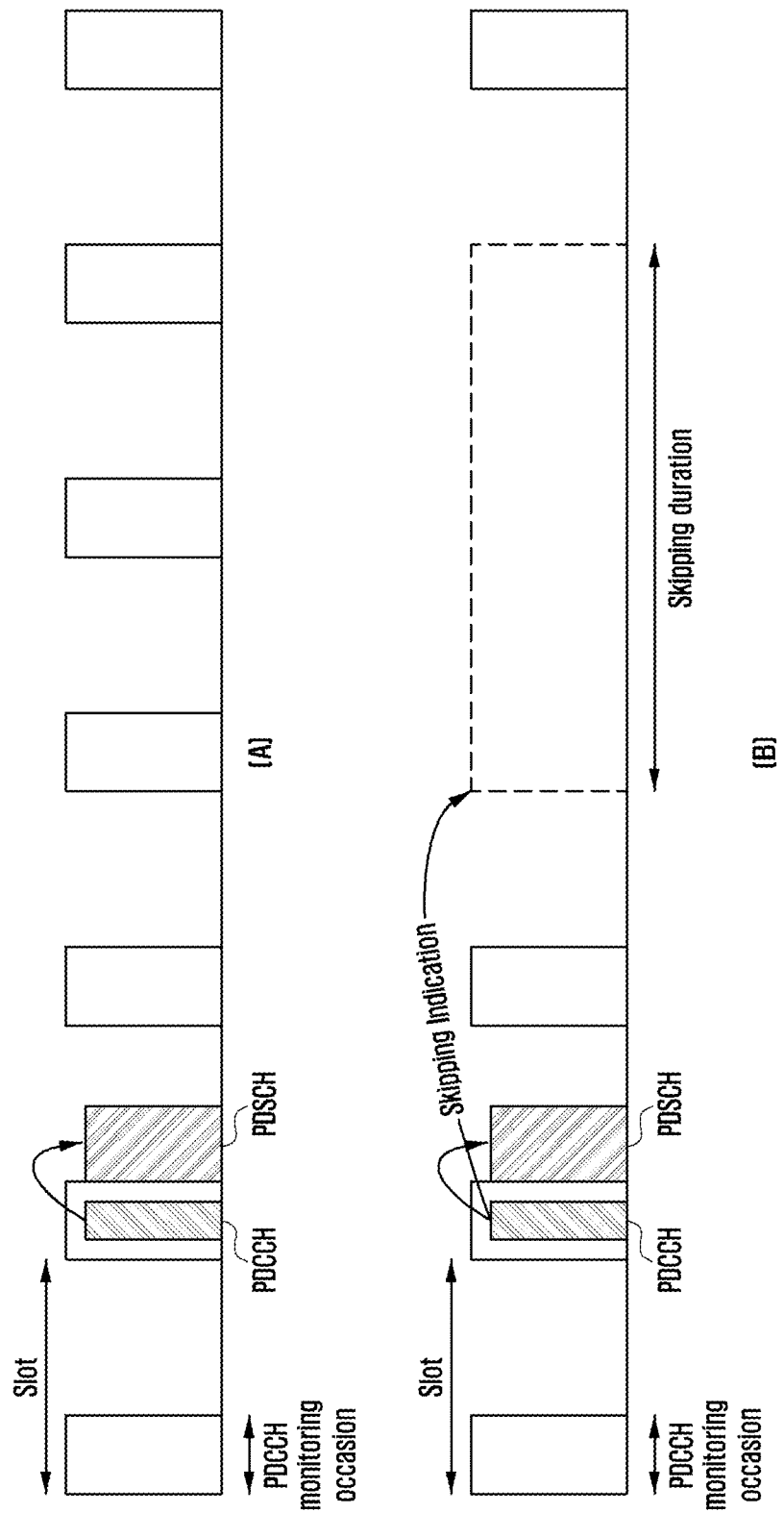
FIG. 1 illustrates an example of PDCCH skipping applied by a UE for PDCCH monitoring in an RRC_CONNECTED state in accordance with an embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or next generation node B (gNB).

The "UE" is an entity communicating with a BS and may be referred to as UE, device, mobile station (MS), mobile equipment (ME), or terminal.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

CA/Multi-connectivity in fifth generation wireless communication system: The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the master node (MN) and the other as the Secondary Node (SN). The MN and SN are connected via a network interface and at least the MN is connected to the core network. NR also supports multi-RAT dual connectivity (MR-DC) operation whereby a UE in radio resource control (RRC)_CONNECTED is configured to utilise radio resources provided by two distinct schedulers, located in two different nodes connected via a non-ideal backhaul and providing either evolved-universal mobile telecommunications system (UMTS) terrestrial radio access (E-UTRA) (i.e., if the node is an ng-eNB) or new radio (NR) access (i.e., if the node is a gNB).

In NR for a UE in RRC_CONNECTED not configured with carrier aggregation (CA)/DC there is only one serving cell comprising of the primary cell. For a UE in RRC_CONNECTED configured with CA/DC the term "serving cells" is used to denote the set of cells comprising of the special cell(s) and all secondary cells. In NR, the term master cell group (MCG) refers to a group of serving cells associated with the Master Node, comprising of the primary cell (PCell) and optionally one or more secondary cells (SCells). In NR, the term secondary cell group (SCG) refers to a group of serving cells associated with the secondary node, comprising of the primary SCG cell (PSCell) and optionally one or more SCells.

In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the reconfiguration with a sync procedure. For Dual Connectivity operation the term SpCell (i.e., special cell) refers to the PCell of the MCG or the PSCell of the SCG, otherwise the term special cell refers to the PCell.

Random access in fifth generation wireless communication system: In the 5G wireless communication system, random access (RA) is supported. RA is used to achieve uplink (UL) time synchronization. RA is used during initial access, handover, an RRC connection re-establishment procedure, scheduling request transmission, SCG addition/modification, beam failure recovery and data or control information transmission in UL by a non-synchronized UE in an RRC CONNECTED state. Several types of random access procedure is supported such as contention based random access, contention free random access and each of these can be one of 2 step or 4 step random access.

Bandwidth Part (BWP) operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a BWP. BA is achieved by configuring RRC connected UE with BWP(s) and notifying the UE which of the configured BWPs is currently the active one. When BA is configured, the UE only may monitor physical downlink control channel (PDCCH) on the one active BWP i.e., the UE may not monitor PDCCH on the entire downlink (DL) frequency of the serving cell.

In an RRC connected state, the UE is configured with one or more DL and UL BWPs, for each configured serving cell (i.e., PCell or Scell). For an activated serving cell, there is always one active UL BWP and DL BWP at any point in time. The BWP switching for a serving cell is used to activate an inactive BWP and deactivate an active BWP at a time. The BWP switching is controlled by the PDCCH indicating a downlink assignment or an uplink grant, by the bwp-InactivityTimer, by an RRC signalling, or by the MAC entity itself upon initiation of random access procedure. Upon addition of SpCell or activation of an Scell, the DL BWP and UL BWP indicated by firstActiveDownlinkBWP-Id and firstActiveUplinkBWP-Id respectively is active without receiving PDCCH indicating a downlink assignment or an uplink grant. The active BWP for a serving cell is indicated by either RRC or PDCCH. For unpaired spectrum, a DL BWP is paired with a UL BWP, and BWP switching is common for both UL and DL. Upon expiry of BWP inactivity timer, the UE switches to the default DL BWP or initial DL BWP (if default DL BWP is not configured).

In the 5G wireless communication system, RRC can be in one of the following states: RRC_IDLE, RRC_INACTIVE, and RRC_CONNECTED. A UE is either in an RRC_CONNECTED state or in an RRC_INACTIVE state when an RRC connection has been established. If this is not the case, i.e., no RRC connection is established, the UE is in an RRC_IDLE state. The RRC states can further be characterized as follows:

In the RRC_IDLE, a UE specific discontinuous reception (DRX) may be configured by upper layers. The UE monitors Short Messages transmitted with paging—radio network temporary identity (RNTI) (P-RNTI) over downlink control information (DCI); monitors a Paging channel for core network (CN) paging using 5G-S-temoprary mobile subscriber identity (5G-S-TMSI); performs neighboring cell measurements and cell (re-)selection; acquires system information and can send system information (SI) request (if configured); performs logging of available measurements together with location and time for logged measurement configured UEs.

In RRC_INACTIVE, a UE specific DRX may be configured by upper layers or by an RRC layer; the UE stores the UE Inactive access stratum (AS) context; a radio access network (RAN)-based notification area is configured by RRC layer. The UE monitors short messages transmitted with P-RNTI over DCI; monitors a paging channel for CN paging using 5G-S-TMSI and RAN paging using full I-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context, and transfer of unicast data to/from the UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

PDCCH in fifth generation wireless communication system: In the fifth generation wireless communication system, PDCCH is used to schedule DL transmissions on physical downlink shared channel (PDSCH) and UL transmissions on physical uplink shared channel (PUSCH), where the DCI on PDCCH includes: downlink assignments containing at least modulation and coding format, resource allocation, and hybrid-automatic repeat request (ARQ) information related to downlink—shared channel (DL-SCH); uplink scheduling grants containing at least modulation and coding format, resource allocation, and hybrid-ARQ information related to uplink—shared channel (UL-SCH). In addition to scheduling, PDCCH can be used to for: activation and deactivation of configured PUSCH transmission with configured grant;

Activation and deactivation of PDSCH semi-persistent transmission; notifying one or more UEs of the slot format; notifying one or more UEs of the physical resource block (PRB)(s) and orthogonal frequency division multiplexing (OFDM) symbol(s) where the UE may assume no transmission is intended for the UE; transmission of transmission power control (TPC) commands for physical uplink control channel (PUCCH) and PUSCH; transmission of one or more TPC commands for sounding reference signal (SRS) transmissions by one or more UEs; switching a UE's active bandwidth part; initiating a random access procedure.

A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE comprising a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations is signalled by a gNB for each configured BWP of serving cell, wherein each search space configuration is uniquely identified by a search space identifier. Search space identifier is unique amongst the BWPs of a serving cell. Identifier of search space configuration to be used for specific purpose such as paging reception, SI reception, random access response reception is explicitly signalled by the gNB for each configured BWP. In NR search space configuration comprises of parameters monitoring-periodicity-PDCCH-slot, monitoring-offset-PDCCH-slot, monitoring-symbols-PDCCH-within-slot and duration. A UE determines PDCCH monitoring occasion (s) within a slot using the parameters PDCCH monitoring periodicity (monitoring-periodicity-PDCCH-slot), the PDCCH monitoring offset (monitoring-offset-PDCCH-slot), and the PDCCH monitoring pattern (monitoring-symbols-PDCCH-within-slot). PDCCH monitoring occasions are there in slots "x" to x+duration where the slot with number "x" in a radio frame with number "y" satisfies the equation below:

$$(y*(\text{number of slots in a radio frame}) + x - \text{monitoring-offset-PDCCH-slot}) \bmod (\text{monitoring-periodicity-PDCCH-slot}) = 0;$$

The starting symbol of a PDCCH monitoring occasion in each slot having PDCCH monitoring occasion is given by monitoring-symbols-PDCCH-within-slot. The length (in symbols) of a PDCCH monitoring occasion is given in the CORESET associated with the search space. Search space configuration includes the identifier of CORESET configuration associated with it. A list of CORESET configurations are signalled by a gNB for each configured BWP of serving cell wherein each CORESET configuration is uniquely identified by an CORESET identifier. CORESET identifier is unique amongst the BWPs of a serving cell. Note that each radio frame is of 10 ms duration. Radio frame is identified by a radio frame number or a system frame number. Each radio frame comprises of several slots, wherein the number of slots in a radio frame and duration of slots depends on subcarrier spacing (SCS).

The number of slots in a radio frame and duration of slots depend radio frame for each supported SCS is pre-defined in NR. Each CORESET configuration is associated with a list of TCI (Transmission configuration indicator) states. One DL reference signal (RS) identifier (ID) (synchronization signal block (SSB) or channel state information reference signal (CSI RS)) is configured per transmission configuration indicator (TCI) state. The list of TCI states corresponding to a CORESET configuration is signalled by the gNB via an RRC signalling. One of the TCI state in TCI state list is activated and indicated to a UE by the gNB. TCI state indicates the DL TX beam (DL TX beam is quasi co located (QCLed) with SSB/CSI RS of TCI state used by the gNB for transmission of PDCCH in the PDCCH monitoring occasions of a search space.

In a 5G wireless communication system, the PDCCH monitoring activity of the UE in an RRC connected mode is governed by DRX. When DRX is configured, the UE may not continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which the UE can go back to sleep. The UE may restart the inactivity timer following a single successful decoding of a PDCCH for a first transmission only (i.e., not for retransmissions);

retransmission-timer: duration until a retransmission can be expected;

cycle: specifies the periodic repetition of the on-duration followed by a possible period of inactivity (see FIG. 5 below); and active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In the RRC_CONNECTED serving cells of a medium access control (MAC) entity may be configured by RRC in two DRX groups with separate DRX parameters. Note that MAC entity is per cell group (CG). When RRC does not configure a secondary DRX group in a CG, there is only one DRX group in that CG and all serving cells of that belong to that one DRX group. When two DRX groups are configured in a CG, each serving cell of CG is uniquely assigned to either of the two groups. DRX parameters are categorised into group specific parameters and common parameters. The group specific parameters consist of drx-onDurationTimer and drx-InactivityTimer. The common parameters consist of drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

Meanwhile, there have been various studies on optimising PDCCH monitoring in 5G communication system recently. PDCCH skipping as illustrated in FIG. 1 can be applied by a UE for PDCCH monitoring in an RRC_CONNECTED state. FIG. 1 (e.g., (A) of FIG. 1) illustrates normal PDCCH monitoring where the UE monitors all the configured PDCCH monitoring occasions. FIG. 1 (e.g., (B) of FIG. 1) illustrates PDCCH skipping indicated by scheduling DCI. The scheduling DCI is the DCI which indicates scheduled DL or UL resources. Skipping duration can be indicated by an RRC message, can be indicated by DCI, or can be pre-defined. Upon receiving PDCCH skipping indication, the UE skips PDCCH monitoring during the skipping duration.

Search space set group (SSSG) switching for PDCCH skipping can also be applied by the UE for PDCCH monitoring in an RRC_CONNECTED state. The UE can be switched to an "empty" SSSG i.e., no search space (SS) set(s) is configured for this SSSG. So, the UE does not monitor PDCCH when the UE switches to it.

The above information is presented as background information only to assist with an understanding of the disclosure. No determination has been made, and no assertion is made, as to whether any of the above might be applicable as prior art with regard to the disclosure.

Figure 2:
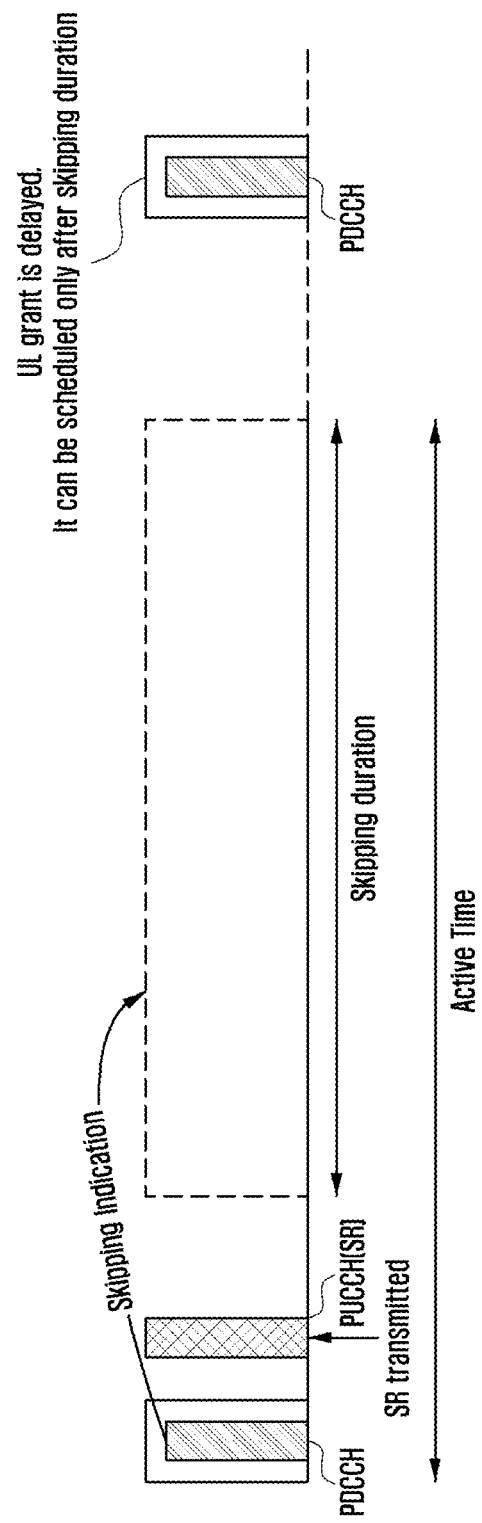
FIG. 2 illustrates an example of UL grant PDCCH skipping duration in accordance with an embodiment of the present disclosure.

If the UE has received PDCCH skipping indication and scheduling request (SR) is triggered for buffer status report (BSR), beam failure recovery (BFR), or consistent listen before talk (LBT) failure, and SR is transmitted over PUCCH, UL grant (scheduled by PDCCH) is delayed due to skipping duration as illustrated in FIG. 2. One way to overcome this problem is that the UE cancels/ignores PDCCH skipping on all serving cells of cell group while the SR is pending for the corresponding cell group. Note that SR is triggered per cell group. Cancelling/ignoring PDCCH skipping on all serving cells of cell group increases UE power consumption. It is beneficial to limit cancelling/ignoring PDCCH skipping only on some serving cell(s). An enhanced method to cancel/ignore PDCCH skipping while SR is pending is needed.

Figure 3:
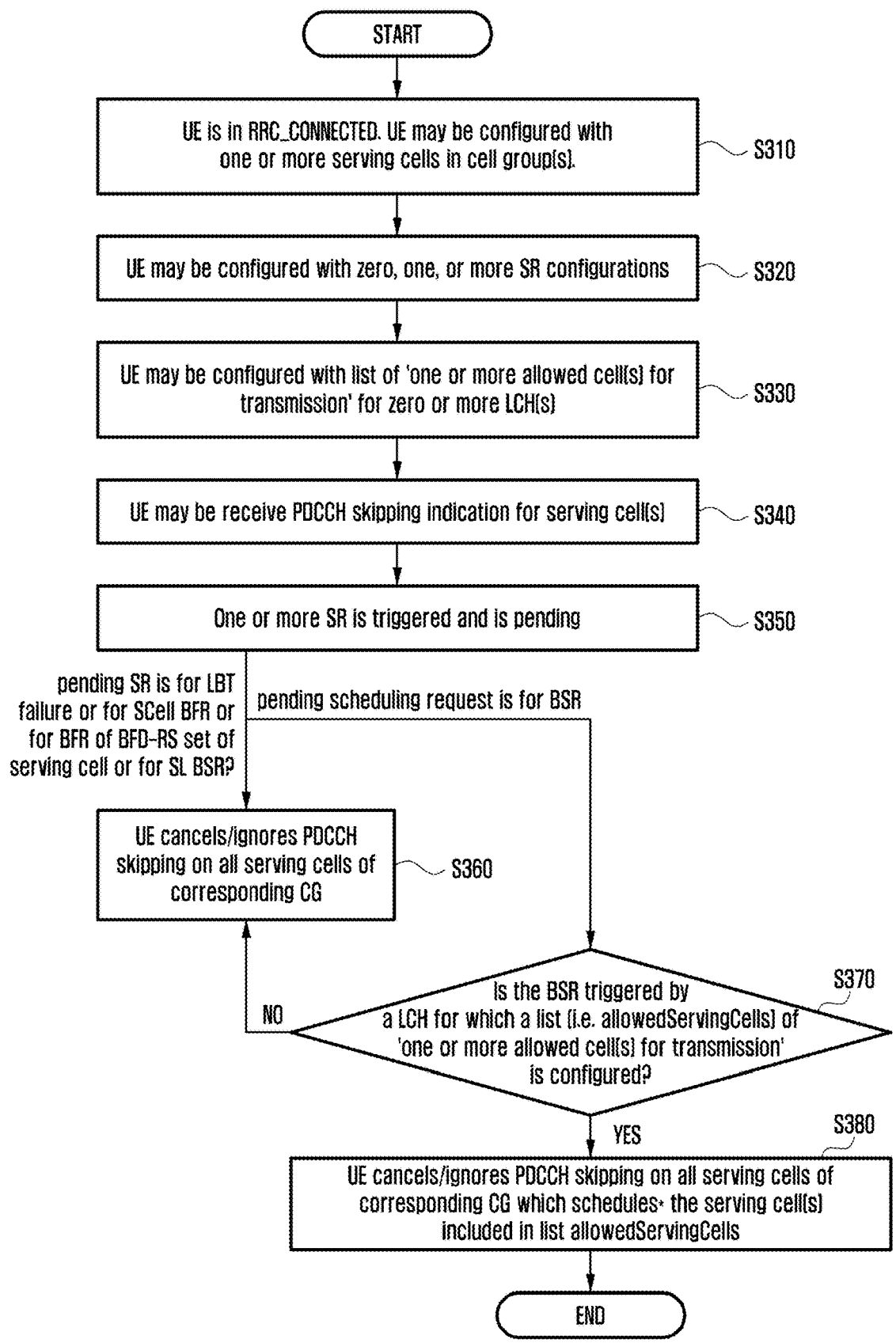
FIG. 3 illustrates a flow chart for a PDCCH skip operation in accordance with an embodiment of the present disclosure.

FIG. 3 illustrates a flow chart for PDCCH skip operation in accordance with an embodiment of the present disclosure.

Referring to FIG. 3, a UE is in an RRC_CONNECTED state. The UE may be configured with one or more serving cells in at least one cell group (S310).

Also, the UE may be configured with zero, one, or more SR configurations (S320) and list of one or more allowed cell(s) for transmission for zero or more logical channel(s) (LCH(s)) (S330).

A UE monitors PDCCH in the active DL BWP of SpCell and active DL BWP(s) of activated secondary cell(s). The PDCCH is monitored in PDCCH monitoring occasions configured by one or more search space configurations of active DL BWP.

A UE receives DCI on PDCCH from a serving cell, and the DCI includes information indicating PDCCH skipping (S340). In an embodiment, in the RRC_CONNECTED state, a UE may indicate to a gNB using a dedicated RRC message whether the UE supports PDCCH skipping. Only if the gNB has received indication from the UE that the UE supports PDCCH skipping, the gNB sends PDCCH skipping indication in DCI.

In the RRC_CONNECTED state, SR is used for requesting UL-SCH resources for new transmission. The MAC entity (or CG) may be configured with zero, one, or more SR configurations as explained above in S320. MAC entity is separate for each CG i.e., MCG and SCG. An SR configuration consists of a set of PUCCH resources for SR across different BWPs and cells. For a logical channel or for SCell beam failure recovery, for beam failure recovery of beam failure detection (BFD)-RS set (or transmission and reception point (TRP)) of serving cell, and for consistent LBT failure recovery, at most one PUCCH resource for SR is configured per BWP. Each SR configuration corresponds to one or more logical channels and/or to SCell beam failure recovery and/or to consistent LBT failure recovery and/or to beam failure recovery of BFD-RS set (or TRP) of serving cell. Each logical channel, SCell beam failure recovery, beam failure recovery of BFD-RS set (or TRP) of serving cell and consistent LBT failure recovery, may be mapped to zero or one SR configuration, which is configured by RRC. The SR configuration of the logical channel that triggered a BSR or the SR configuration of the SCell beam failure recovery or the SR configuration of beam failure recovery of BFD-RS set (or TRP) of serving cell or the SR configuration of the consistent LBT failure recovery (if such a configuration exists) is considered as corresponding SR configuration for the triggered SR.

Then, one or more SR may be triggered and pending (S350). When an SR is triggered, the SR may be considered as pending until the SR is cancelled.

All pending SR(s) for BSR triggered prior to the MAC protocol data unit (PDU) assembly may be cancelled, and each respective sr-ProhibitTimer may be stopped when the MAC PDU is transmitted and this PDU includes a Long or Short BSR MAC control element (CE) which contains buffer status up to (and including) the last event that triggered a BSR prior to the MAC PDU assembly. All pending SR(s) for BSR triggered according to the BSR procedure may be cancelled and each respective sr-ProhibitTimer may be stopped when the UL grant(s) can accommodate all pending data available for transmission.

If this SR was triggered by beam failure recovery of an SCell, and a MAC PDU is transmitted, and this PDU includes a BFR MAC CE, a truncated BFR MAC CE, enhanced BFR MAC CE, or a truncated enhanced BFR MAC CE which contains beam failure recovery information for this SCell; or if this SR was triggered by beam failure recovery of an SCell and this SCell is deactivated: MAC entity cancel the pending SR and stop the corresponding sr-ProhibitTimer, if running.

If this SR was triggered by consistent LBT failure recovery of an SCell, and a MAC PDU is transmitted, and the MAC PDU includes an LBT failure MAC CE that indicates consistent LBT failure for this SCell; or if this SR was triggered by consistent LBT failure recovery of an SCell, and all the triggered consistent LBT failure(s) for this SCell are cancelled: MAC entity cancel the pending SR and stop the corresponding sr-ProhibitTimer, if running.

If this SR was triggered by beam failure recovery for a BFD-RS set of a serving cell, and a MAC PDU is transmitted, and this PDU includes an Enhanced BFR MAC CE or a truncated enhanced BFR MAC CE which contains beam failure recovery information for this BFD-RS set of the serving cell: MAC entity cancel the pending SR and stop the corresponding sr-ProhibitTimer, if running.

If this SR was triggered by beam failure recovery for a BFD-RS set of an SCell and this Scell is deactivated: MAC entity cancel the pending SR and stop the corresponding sr-ProhibitTimer, if running.

In this method of this disclosure, if scheduling request is transmitted on PUCCH and is pending at the time when the PDCCH skipping indication is received; or if scheduling request is transmitted on PUCCH and is pending during the PDCCH skipping duration (the DCI indicating PDCCH skipping may be received before or after the scheduling request is transmitted on PUCCH); or if scheduling request is transmitted on PUCCH and is pending, a UE i.e., MAC entity in the UE performs the following operation:

If pending scheduling request is for LBT failure, if the pending scheduling request is for Scell BFR, if the pending scheduling request is for BFD-RS set of serving cell in MAC entity of a CG (CG can be MCG or SCG), or if the pending scheduling request is for SL BSR;

A UE cancels/ignores PDCCH skipping on all serving cells of corresponding CG (S360). In an embodiment, the UE cancels/ignores PDCCH skipping on all serving cells of corresponding CG while the SR is pending. In an embodiment, for the part of skipping duration where SR is pending, the UE cancels/ignores PDCCH skipping, for the part of skipping duration where SR is not pending, the UE applies PDCCH skipping;

Else if pending scheduling request is for BSR in MAC entity of a CG; and

If the BSR is triggered by a LCH for which a list (i.e., allowedServingCells) of "one or more allowed cell(s) for transmission" is configured (i.e., received in RRC message e.g., RRCReconfiguration message from a gNB) (S370): A UE cancels/ignores PDCCH skipping on all serving cells of corresponding CG which schedules the serving cell(s) included in list allowedServingCells (S380). In an embodiment, a UE cancels/ignores PDCCH skipping on all serving cells of corresponding CG which schedules the serving cell(s) included in list allowedServingCells while the SR is pending. In an embodiment, the part of skipping duration where SR is pending, a UE cancels/ignores PDCCH skipping, the part of skipping duration where SR is not pending, the UE applies PDCCH skipping.

In case of cross carrier scheduling, a serving cell X is scheduled by another serving cell Y i.e., PDCCH for DL/UL transport block (TB) transmission on serving cell X is received/transmitted on serving cell Y by a UE/gNB. In case of self-scheduling, a serving cell X is scheduled by serving cell X itself i.e., PDCCH for DL/UL TB on serving cell X is received/transmitted on serving cell X by a UE/gNB. For a serving cell which is SCell, whether the serving cell is self-scheduled or cross carrier scheduled, and in case of cross carrier scheduled, serving cell which schedules this serving cell is indicated by a gNB in an RRC message e.g., RRCReconfiguration message. For a serving cell which is SpCell, the serving cell is self-scheduled. Additionally, the serving cell can be cross carrier scheduled by another serving cell, indicated by the gNB in an RRC message e.g., RRCReconfiguration message.

Example 1: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 and serving cell 2 are both self-scheduled, i.e., PDCCH indicating UL SCH resources/DL SCH resources for TB transmission/reception on serving cell 1 is received from serving cell 1 by UE, PDCCH indicating UL SCH resources/DL SCH resources for transmission/reception on serving cell 2 is received from serving cell 2. In this case, MAC entity cancels/ignores PDCCH skipping on serving cell 1 and serving cell 2 while SR for BSR triggered by the LCH A is pending.

Example 2: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 and serving cell 2 are both cross carrier-scheduled by serving cell 3 and serving cell 4 respectively, i.e., PDCCH indicating UL SCH resources/DL SCH resources for TB transmission/re- ception on serving cell 1 is received from serving cell 3 by UE, PDCCH indicating UL SCH resources/DL SCH resources for transmission/reception on serving cell 2 is received from serving cell 4 by UE. In this case, MAC entity cancels/ignores PDCCH skipping on serving cell 3 and serving cell 4 while SR for BSR triggered by the LCH A is pending.

Example 3: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 is cross carrier scheduled by serving cell 3 and serving cell 2 is self-scheduled, i.e., PDCCH indicating UL SCH resources/DL SCH resources for TB transmission/reception on serving cell 1 is received from serving cell 3 by UE, PDCCH indicating UL SCH resources/DL SCH resources for transmission/reception on serving cell 2 is received from serving cell 2 by UE. In this case, MAC entity cancels/ignores PDCCH skipping on serving cell 3 and serving cell 2 while SR for BSR triggered by the LCH A is pending.

If the BSR is triggered by a LCH for which a list (i.e., allowedServingCells) of "one or more allowed cell(s) for transmission" is not configured.

A UE cancels/ignores PDCCH skipping on all serving cells of corresponding CG. In an embodiment, a UE cancels/ignores PDCCH skipping on all serving cells of corresponding CG while the SR is pending. In an embodiment, for the part of skipping duration where SR is pending, a UE cancels/ignores PDCCH skipping, for the part of skipping duration where SR is not pending, the UE applies PDCCH skipping.

In an embodiment, in the above description, PDCCH indicates a UE to switch to an empty SSSG (i.e., SSSG not configured with any search space sets) or default SSSG is also considered as PDCCH skipping indication. Skipping duration can be defined by a timer in this case or the skipping duration can be the time duration until the UE receives PDCCH indicating the UE to switch to a non-empty SSSG or non-default SSSG.

In an embodiment, the above operation can also be applied in RRC_INACTIVE and/or RRC_IDLE, for example a UE may receive the PDCCH skipping indication during the small data transmission procedure in RRC_INACTIVE, and SR can be triggered and be transmitted in an RRC_INACTIVE state. The PDCCH skipping indication can be indicated in wakeup signal or early paging indication, or in random access response (RAR) or message B (MsgB) in RRC_INACTIVE and/or RRC_IDLE. In an embodiment, for small data transmission (SDT) procedure in RRC_INACTIVE or in an RRC_IDLE state, if RA is initiated for SDT, PDCCH skipping indication can be sent by a gNB in between message 4 (Msg4) (including contention resolution identity MAC CE) transmission or MsgB (including contention resolution identity) transmission and RRC Release message transmission. In an embodiment, for small data transmission procedure in an RRC_INACTIVE state or in an RRC_IDLE state, if RA is initiated for SDT, PDCCH skipping indication can be sent by the gNB after the successful completion of random access procedure.

In an embodiment in the above description, serving cells refers to activated serving cells, network may configure multiple serving cells but some may be activated and others may be deactivated.

Figure 4:
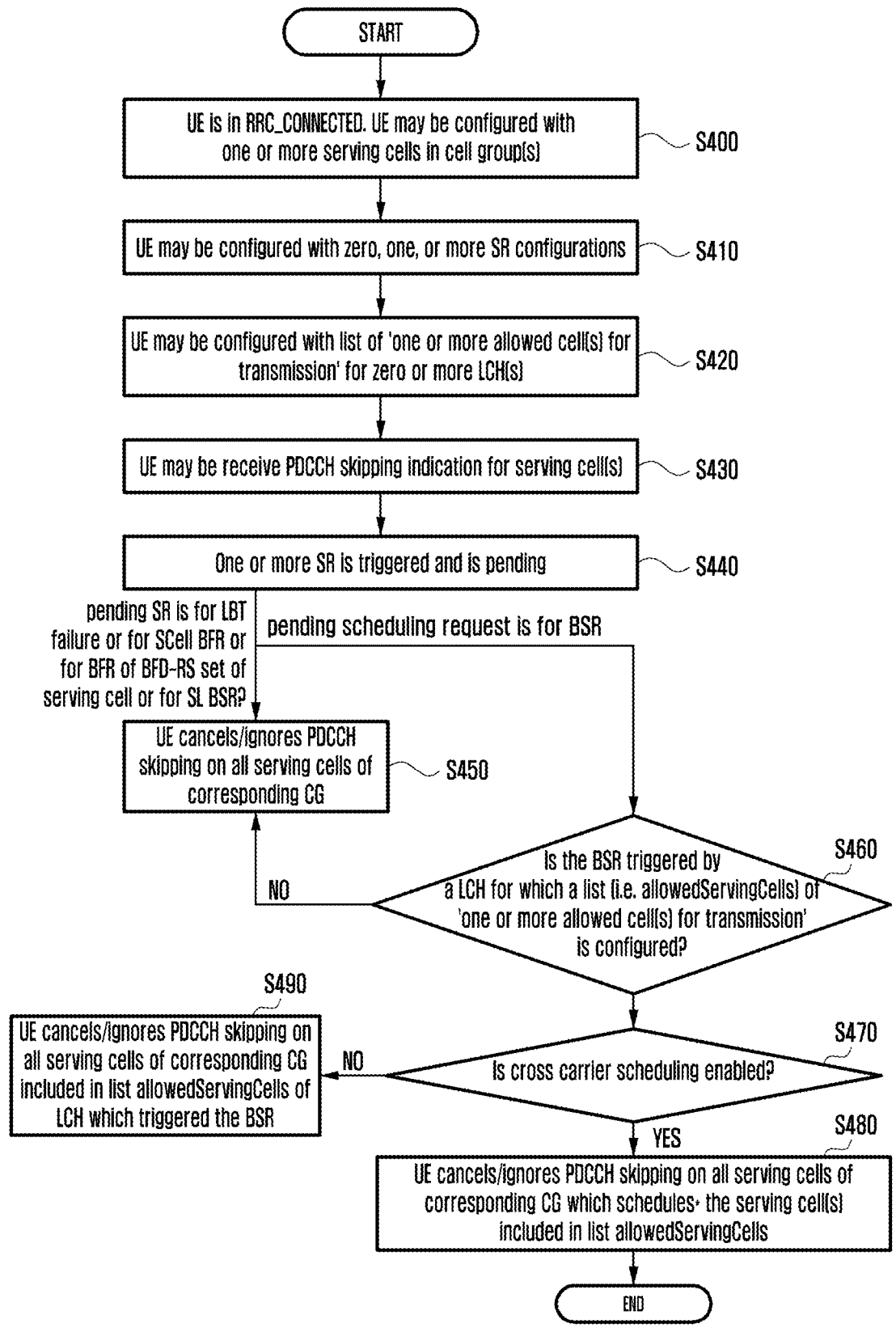
FIG. 4 illustrates a flow chart for a PDCCH skip operation in accordance with another embodiment of the present disclosure.

FIG. 4 illustrates a flow chart for PDCCH skip operation in accordance with another embodiment of the present disclosure.

Referring to FIG. 4, a UE is in an RRC_CONNECTED state. The UE may be configured with one or more serving cells in at least one cell group(s) (S400).

Also, the UE may be configured with zero, one, or more SR configurations (S410) and list of "one or more allowed cell(s) for transmission" for zero or more LCH(s) (S420).

A UE monitors PDCCH in the active DL BWP of SpCell and active DL BWP(s) of activated Secondary cell(s). The PDCCH is monitored in PDCCH monitoring occasions configured by one or more search space configurations of active DL BWP.

A UE receives DCI on PDCCH from a serving cell, the DCI includes information indicating PDCCH skipping (S430). In an embodiment, in the RRC_CONNECTED state, a UE may indicate to a gNB using a dedicated RRC message whether the UE supports PDCCH skipping. Only if the gNB has received indication from the UE that the supports PDCCH skipping, the gNB sends PDCCH skipping indication in DCI.

In the RRC_CONNECTED state, SR is used for requesting UL-SCH resources for new transmission. The MAC entity (or CG) may be configured with zero, one, or more SR configurations explained above in S410. MAC entity is separate for each CG, i.e., MCG and SCG. An SR configuration consists of a set of PUCCH resources for SR across different BWPs and cells. For a logical channel or for SCell beam failure recovery, for beam failure recovery of BFD-RS set (or TRP) of serving cell and for consistent LBT failure recovery, at most one PUCCH resource for SR is configured per BWP. Each SR configuration corresponds to one or more logical channels and/or to SCell beam failure recovery and/or to consistent LBT failure recovery and/or to beam failure recovery of BFD-RS set (or TRP) of serving cell. Each logical channel, SCell beam failure recovery, beam failure recovery of BFD-RS set (or TRP) of serving cell and consistent LBT failure recovery, may be mapped to zero or one SR configuration, which is configured by RRC. The SR configuration of the logical channel that triggered a BSR, the SR configuration of the SCell beam failure recovery, the SR configuration of beam failure recovery of BFD-RS set (or TRP) of serving cell, or the SR configuration of the consistent LBT failure recovery (if such a configuration exists) is considered as corresponding SR configuration for the triggered SR.

Then, one or more SR may be triggered and pending (S440). When an SR is triggered, the SR may be considered as pending until the SR is cancelled.

All pending SR(s) for BSR triggered prior to the MAC PDU assembly may be cancelled and each respective sr-ProhibitTimer may be stopped when the MAC PDU is transmitted and this PDU includes a long or short BSR MAC CE which contains buffer status up to (and including) the last event that triggered a BSR prior to the MAC PDU assembly. All pending SR(s) for BSR triggered according to the BSR procedure may be cancelled and each respective sr-ProhibitTimer may be stopped when the UL grant(s) can accommodate all pending data available for transmission.

If this SR was triggered by beam failure recovery of an SCell, and a MAC PDU is transmitted, and this PDU includes a BFR MAC CE, a truncated BFR MAC CE, Enhanced BFR MAC CE, or a truncated enhanced BFR MAC CE which contains beam failure recovery information for this SCell; or if this SR was triggered by beam failure recovery of an SCell and this SCell is deactivated: MAC entity cancel the pending SR and stop the corresponding sr-ProhibitTimer, if running.

If this SR was triggered by consistent LBT failure recovery of an SCell, and a MAC PDU is transmitted, and the MAC PDU includes an LBT failure MAC CE that indicates consistent LBT failure for this SCell; or if this SR was triggered by consistent LBT failure recovery of an SCell, and all the triggered consistent LBT failure(s) for this SCell are cancelled: MAC entity cancel the pending SR and stop the corresponding sr-ProhibitTimer, if running.

If this SR was triggered by beam failure recovery for a BFD-RS set of a serving cell, and a MAC PDU is transmitted, and this PDU includes an Enhanced BFR MAC CE, or a truncated enhanced BFR MAC CE which contains beam failure recovery information for this BFD-RS set of the serving cell: MAC entity cancel the pending SR and stop the corresponding sr-ProhibitTimer, if running.

If this SR was triggered by beam failure recovery for a BFD-RS set of an SCell, and this SCell is deactivated: MAC entity cancel the pending SR and stop the corresponding sr-ProhibitTimer, if running.

In this method of this disclosure, if scheduling request is transmitted on PUCCH and is pending at the time when the PDCCH skipping indication is received; or if scheduling request is transmitted on PUCCH and is pending during the PDCCH skipping duration (the DCI indicating PDCCH skipping may be received before or after the scheduling request is transmitted on PUCCH); or if scheduling request is transmitted on PUCCH and is pending, a UE perform the following operation:

If pending scheduling request is for LBT failure, or if the pending scheduling request is for SCell BFR, or if the pending scheduling request is for BFD-RS set of serving cell in MAC entity of a CG (CG can be MCG or SCG), or if the pending scheduling request is for sidelink (SL) BSR:

UE cancels/ignores PDCCH skipping on all serving cells of corresponding CG (S450). In an embodiment, a UE cancels/ignores PDCCH skipping on all serving cells of corresponding CG while the SR is pending. In an embodiment, for the part of skipping duration where SR is pending, a UE cancels/ignores PDCCH skipping, for the part of skipping duration where SR is not pending, the UE applies PDCCH skipping;

Else if pending scheduling request is for BSR in MAC entity of a CG;

If the BSR is triggered by a LCH for which a list (i.e., allowedServingCells) of "one or more allowed cell(s) for transmission" is configured (i.e., received in an RRC message e.g., RRCReconfiguration message from a gNB) (S460); and If cross carrier scheduling is enabled (cross carrier scheduling is enabled or not can be indicated by a gNB in an RRC message e.g., RRCReconfiguration message) (S470): a UE cancels/ignores PDCCH skipping on all serving cells of corresponding CG which schedules the serving cell(s) included in list allowedServingCells (S480). In an embodiment, a UE cancels/ignores PDCCH skipping on all serving cells of corresponding CG which schedules the serving cell(s) included in list allowedServingCells while the SR is pending. In an embodiment, for the part of skipping duration where SR is pending, a UE cancels/ignores PDCCH skipping, for the part of skipping duration where SR is not pending, the UE applies PDCCH skipping.

In case of cross carrier scheduling, a serving cell X is scheduled by another serving cell Y, i.e., PDCCH for DL/UL TB transmission on serving cell X is received/transmitted on serving cell Y by a UE/gNB. In case of self-scheduling, a serving cell X is scheduled by serving cell X itself, i.e., PDCCH for DL/UL TB on serving cell X is received/transmitted on serving cell X by a UE/gNB. For a serving cell which is SCell, identify whether the serving cell is self-scheduled or cross carrier scheduled, and in case of cross carrier scheduled, serving cell which schedules this serving cell is indicated by a gNB in an RRC message e.g., RRCReconfiguration message. For a serving cell which is SpCell, the serving cell is self-scheduled. Additionally, the serving cell can be cross carrier scheduled by another serving cell, indicated by the gNB in an RRC message e.g., RRCReconfiguration message.

Example 1: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 and serving cell 2 are both self-scheduled, i.e., PDCCH indicating UL SCH resources/DL SCH resources for TB transmission/reception on serving cell 1 is received from serving cell 1 by the UE, PDCCH indicating UL SCH resources/DL SCH resources for transmission/reception on serving cell 2 is received from serving cell 2. In this case, MAC entity cancels/ignores PDCCH skipping on serving cell 1 and serving cell 2 while SR for BSR triggered by the LCH A is pending.

Example 2: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 and serving cell 2 are both cross carrier-scheduled by serving cell 3 and serving cell 4 respectively, i.e., PDCCH indicating UL SCH resources/DL SCH resources for TB transmission/reception on serving cell 1 is received from serving cell 3 by the UE, PDCCH indicating UL SCH resources/DL SCH resources for transmission/reception on serving cell 2 is received from serving cell 4 by the UE. In this case, MAC entity cancels/ignores PDCCH skipping on serving cell 3 and serving cell 4 while SR for BSR triggered by the LCH A is pending.

Example 3: In a CG, there are four serving cells including serving cell 1, serving cell 2, serving cell 3, and serving cell 4. allowedServingCells for LCH A which triggered BSR of pending SR includes serving cell 1 and serving cell 2. Serving cell 1 is cross carrier scheduled by serving cell 3 and serving cell 2 is self-scheduled, i.e., PDCCH indicating UL SCH resources/DL SCH resources for TB transmission/reception on serving cell 1 is received from serving cell 3 by UE, PDCCH indicating UL SCH resources/DL SCH resources for transmission/reception on serving cell 2 is received from serving cell 2 by UE. In this case, MAC entity cancels/ignores PDCCH skipping on serving cell 3 and serving cell 2 while SR for BSR triggered by the LCH A is pending.

Else if cross carrier scheduling is not enabled:

A UE cancels/ignores PDCCH skipping on all serving cells of corresponding CG included in list allowedServingCells of LCH which triggered the BSR (S490). In an embodiment, a UE cancels/ignores PDCCH skipping on all serving cells of corresponding CG included in list allowedServingCells of LCH which triggered the BSR, while the SR is pending. In an embodiment, for the part of skipping duration where SR is pending, a UE cancels/ignores PDCCH skipping, for the part of skipping duration where SR is not pending, the UE applies PDCCH skipping.

else If the BSR is triggered by a LCH for which a list (i.e., allowedServingCells) of "one or more allowed cell(s) for transmission" is not configured:

A UE cancels/ignores PDCCH skipping on all serving cells of corresponding CG. In an embodiment, the UE cancels/ignores PDCCH skipping on all serving cells of corresponding CG while the SR is pending. In an embodiment, for the part of skipping duration where SR is pending, a UE cancels/ignores PDCCH skipping, for the part of skipping duration where SR is not pending, the UE applies PDCCH skipping.

In an embodiment, in the above description, PDCCH indicates a UE to switch to an empty SSSG (i.e., SSSG not configured with any search space sets) or default SSSG is also considered as PDCCH skipping indication. Skipping duration can be defined by a timer in this case or the skipping duration can be the time duration until the UE receives PDCCH indicating the UE to switch to a non-empty SSSG or non-default SSSG.

In an embodiment, the above operation can also be applied in RRC_INACTIVE and/or RRC_IDLE, for example a UE may receive the PDCCH skipping indication during the small data transmission procedure in RRC_INACTIVE and, SR can be triggered and transmitted in an RRC_INACTIVE state. The PDCCH skipping indication can be indicated in wakeup signal or early paging indication, or in RAR or MsgB in RRC_INACTIVE and/or RRC_IDLE. In an embodiment, for small data transmission procedure in RRC_INACTIVE or in an RRC_IDLE state, if RA is initiated for SDT, PDCCH skipping indication can be sent by a gNB in between Msg4 (including contention resolution identity MAC CE) transmission or MsgB (including contention resolution identity) transmission and RRC Release message transmission. In an embodiment, for small data transmission procedure in an RRC_INACTIVE state or in an RRC_IDLE state, if RA is initiated for SDT, PDCCH skipping indication can be sent by the gNB after the successful completion of random access procedure.

In an embodiment in the above description serving cells refers to activated serving cells, network may configure multiple serving cells but some may be activated and others may be deactivated.

In methods described in this disclosure, in the skipping duration, upon receiving PDCCH skipping indication, a UE skips PDCCH monitoring (and a gNB skips PDCCH transmission for the UE) addressed to first set of RNTIs and continues monitoring PDCCH monitoring addressed to second set of RNTIs. So in those methods, cancelling/suspending skipping or not skipping the PDCCH in PDCCH skipping duration means, performing PDCCH monitoring (or transmitting PDCCH by the gNB) addressed to first set of RNTIs in PDCCH skipping duration.

The first set of RNTIs and the second set of RNTIs can be pre-defined.

In an embodiment, second set of RNTIs may include RNTIs (e.g., RA-RNTI, P-RNTI, system information (SI)-RNTI, sidelink (SL)-RNTI, MSGB-RNTI) other than RNTIs cell (C)-RNTI, cancellation indication (CI)-RNTI, configured scheduling (CS)-RNTI, interruption (INT)-RNTI, slot format indication (SFI)-RNTI, semi-persistent (SP)-CSI-RNTI, transmit power control (TPC)-PUCCH-RNTI, TPC-PUSCH-RNTI, TPC-SRS-RNTI, and activity indicator (AI)-RNTI. first set of RNTIs include C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI.

In an embodiment, first set of RNTIs include all the RNTIs used for monitoring by a UE in RRC_CONNECTED.

In an embodiment, first set of RNTIs include all the RNTIs used for monitoring by a UE in RRC_CONNECTED except RNTIs related to SL communication.

In an embodiment, the methods described in this disclosure can be applied in RRC_INACTIVE and/or RRC_IDLE by replacing SR transmission with RRC message transmission (e.g., RRC Connection setup request, RRC resume request), replacing SR pending duration with pending duration (duration when T300 is running in case of RRC connection setup request, duration when T319 is running in case of resume request) to receive a response (e.g., RRCSetup, RRCResume) for RRC message transmission.

In methods described in this disclosure, in an embodiment, if criteria (as defined in methods) to cancel/suspend skipping is met, a UE may not apply skipping cancellation/suspension, if skipping duration does not extend until the end of an active time during the DRX operation.

In methods described in this disclosure, in an embodiment, if criteria (as defined in methods) to cancel/suspend skipping is met, a UE may apply skipping cancellation/suspension only for a part/portion of skipping duration, wherein the length of part/portion of skipping duration can be pre-defined or signalled by a gNB in RRC/DCI/MAC CE, the unit in which the length is specified can be in slots/symbols/subframes/frames/number of PDCCH monitoring occasions.

In methods described in this disclosure, in an embodiment, if criteria (as defined in methods) to cancel/suspend skipping is met, a UE may apply skipping cancellation/suspension only for first/earliest PDCCH monitoring occasion in the skipping duration.

In methods described in this disclosure, in an embodiment, if criteria (as defined in methods) to cancel/suspend skipping is met, a UE may apply skipping cancellation/suspension for earliest "N" PDCCH monitoring occasion in the skipping duration, where parameter "N" can be pre-defined or signalled by a gNB in an RRC message or system information.

Figure 5:
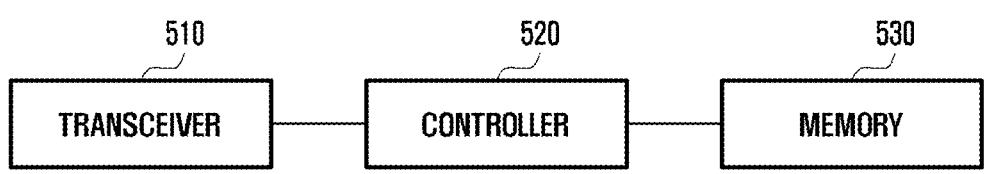
FIG. 5 illustrates a block diagram of a terminal in accordance with an embodiment of the present disclosure.

FIG. 5 illustrates a block diagram of a terminal in accordance with an embodiment of the present disclosure.

Referring to FIG. 5, a terminal includes a transceiver 510, a controller 520, and a memory 530. The controller 520 may refer to a circuitry, an application-specific integrated circuit (ASIC), or at least one processor. The transceiver 510, the controller 520 and the memory 530 are configured to perform the operations of the terminal illustrated in the FIGS. 1 to 4, or described above. Although the transceiver 510, the controller 520 and the memory 530 are shown as separate entities, they may be realized as a single entity like a single chip. Or the transceiver 510, the controller 520 and the memory 530 may be electrically connected to or coupled with each other.

The transceiver 510 may transmit and receive signals to and from other entities, i.e., base station.

The controller 520 may control the terminal to perform functions according to at least one of the embodiments described above. For example, the controller 520 performs PDCCH monitoring and skips the PDCCH monitoring. The controller 520 controls the transceiver 510 and/or the memory 530 to perform an operation of PDCCH monitoring or skipping PDCCH monitoring in accordance with various embodiments of the disclosure.

In an embodiment of the disclosure, the operations of the terminal may be implemented using the memory 530 storing corresponding program codes. Specifically, the terminal may be equipped with the memory 530 to store program codes implementing desired operations. To perform the desired operations, the controller 520 may read and execute the program codes stored in the memory 530 by using at least one processor or a CPU.

Figure 6:
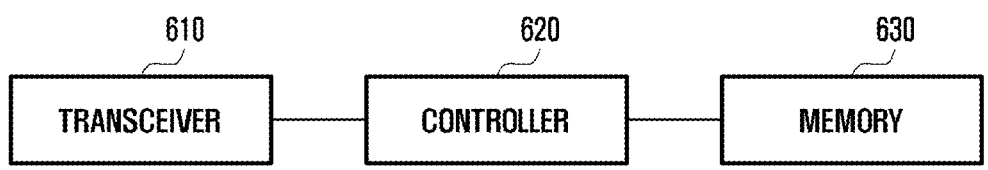
FIG. 6 illustrates a block diagram of a base station in accordance with an embodiment of the present disclosure.

FIG. 6 illustrates a block diagram of a base station in accordance with an embodiment of the present disclosure.

Referring to FIG. 6, a base station includes a transceiver 610, a controller 620 and a memory 630. The controller 620 may refer to a circuitry, an ASIC, or at least one processor. The transceiver 610, the controller 620 and the memory 630 are configured to perform the operations of the terminal illustrated in the FIGS. 1 to 4, or described above. Although the transceiver 610, the controller 620 and the memory 630 are shown as separate entities, they may be realized as a single entity like a single chip. Or the transceiver 610, the controller 620 and the memory 630 may be electrically connected to or coupled with each other.

The transceiver 610 may transmit and receive signals to and from other network entities, i.e., a terminal.

The controller 620 may control the base station to perform functions according to at least one of the embodiments described above. For example, the controller 620 controls the transceiver 610 to transmit information for PDCCH monitoring or PDCCH monitoring skipping (i.e., PDCCH monitoring skip indication) to the terminal.

In an embodiment, the operations of the base station may be implemented using the memory 630 storing corresponding program codes. Specifically, the base station may be equipped with the memory 630 to store program codes implementing desired operations according to various embodiments of the disclosure. To perform the desired operations, the controller 620 may read and execute the program codes stored in the memory 630 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analysed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:

receiving, from a base station, downlink control information (DCI) including an indication indicating a skip operation of physical downlink control channel (PDCCH) monitoring for a duration; and in case that a scheduling request (SR) is triggered and not canceled, identifying at least one serving cell for which the skip operation is to be canceled, based on a determination whether the SR is triggered for a buffer status report (BSR), wherein the skip operation of the PDCCH monitoring is cancelled on the at least one serving cell;

wherein, in case that the SR is triggered for the BSR, the at least one serving cell is identified as one or more allowed serving cells for a logical channel, data from the logical channel being mapped to the one or more allowed serving cells and the BSR being triggered for the logical channel, and wherein, in case that the SR is not triggered for the BSR, the at least one serving cell is identified as all serving cells configured in a cell group, the SR pending for the cell group.

2. The method of claim 1, in case that the SR is triggered for the BSR, wherein, that the at least one serving cell is identified as a scheduling cell based on the one or more allowed serving cells being cross-scheduled by the scheduling cell.

3. The method of claim 1, wherein, in case that the SR is not triggered for the BSR, the SR is triggered based on a listen before talk (LBT) failure, a secondary cell (SCell) beam failure recovery (BFR), a BFR of a beam failure detection (BFD)-reference signal (RS) set of a serving cell, or a sidelink (SL) BSR.

4. The method of claim 1, wherein canceling the skip operation of the PDCCH monitoring comprises:
canceling the skip operation during a first part of the duration where the SR is pending; and
applying the skip operation during a second part of the duration where the SR is not pending.

5. The method of claim 1, further comprising:
receiving, from the base station via a radio resource control (RRC) message, information for configuring the cell group, information for configuring the one or more allowed serving cells for the logical channel, and information on the duration.

6. The method of claim 1, further comprising:
transmitting, to the base station, information indicating that the terminal supports the skip operation,
wherein the indication is included in the DCI based on the information.

7. A terminal in a wireless communication system, the terminal comprising:
a transceiver; and
a controller configured to:
control the transceiver to receive, from a base station, downlink control information (DCI) including an indication indicating a skip operation of physical downlink control channel (PDCCH) monitoring for a duration, and in case that a scheduling request (SR) is triggered and not canceled, identify at least one serving cell for which the skip operation is to be canceled, based on a determination whether the SR is triggered for a buffer status report (BSR), wherein the skip operation of the PDCCH monitoring is cancelled on the at least one serving cell, wherein, in case that the SR is triggered for the BSR, the at least one serving cell is identified as one or more allowed serving cells for a logical channel, data from the logical channel being mapped to the one or more allowed serving cells and the BSR being triggered for the logical channel, and wherein, in case that the SR is not triggered for the BSR, the at least one serving cell is identified as all serving cells configured in a cell group, the SR pending for the cell group.

8. The terminal of claim 7, in case that the SR is triggered for the BSR, wherein the at least one serving cell is identified as a scheduling cell based on the one or more allowed serving cells being cross-scheduled by the scheduling cell.

9. The terminal of claim 7, wherein, in case that the SR is not triggered for the BSR, the SR is triggered based on a listen before talk (LBT) failure, a secondary cell (SCell) beam failure recovery (BFR), a BFR of a beam failure detection (BFD)-reference signal (RS) set of a serving cell, or a sidelink (SL) BSR.

10. The terminal of claim 7, wherein the controller is further configured to:
cancel the skip operation during a first part of the duration where the SR is pending; and
apply the skip operation during a second part of the duration where the SR is not pending.

11. The terminal of claim 7, wherein the controller is further configured to control the transceiver to receive, from the base station via a radio resource control (RRC) message, information for configuring the cell group, information for configuring the one or more allowed serving cells for the logical channel, and information on the duration.

12. The terminal of claim 7, wherein the controller is further configured to control the transceiver to transmit, to the base station, information indicating that the terminal supports the skip operation, and
wherein the indication is included in the DCI based on the information.

* * * * *